United States Patent
Shah et al.

(10) Patent No.: US 10,318,303 B2
(45) Date of Patent: Jun. 11, 2019

(54) METHOD AND APPARATUS FOR AUGMENTATION AND DISAMBIGUATION OF BRANCH HISTORY IN PIPELINED BRANCH PREDICTORS

(71) Applicant: Oracle International Corporation, Redwood City, CA (US)

(72) Inventors: Manish Shah, Austin, TX (US); Jared Smolens, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 79 days.

(21) Appl. No.: 15/471,001

(22) Filed: Mar. 28, 2017

(65) Prior Publication Data

US 2018/0285114 A1    Oct. 4, 2018

(51) Int. Cl.
    G06F 9/42       (2006.01)
    G06F 9/32       (2018.01)
    G06F 12/02      (2006.01)
    G06F 9/38       (2018.01)
    G06F 9/30       (2018.01)
    G06F 12/0875    (2016.01)
    G06F 12/0864    (2016.01)

(52) U.S. Cl.
    CPC ........ G06F 9/3806 (2013.01); G06F 9/30029 (2013.01); G06F 9/3867 (2013.01); G06F 12/0864 (2013.01); G06F 12/0875 (2013.01); G06F 9/30058 (2013.01); G06F 9/30134 (2013.01); G06F 9/3844 (2013.01); G06F 9/3846 (2013.01); G06F 9/3848 (2013.01); G06F 2212/452 (2013.01)

(58) Field of Classification Search
    CPC .. G06F 9/3806; G06F 9/30029; G06F 9/3867; G06F 9/30058; G06F 9/30061; G06F 9/30134; G06F 9/3844; G06F 9/3846; G06F 12/0864; G06F 2212/452; G06F 17/30949; G06F 9/6082
    USPC ......... 712/205, 207, 235–240; 711/125, 128, 711/216, 126
    See application file for complete search history.

(56) References Cited

U.S. PATENT DOCUMENTS

| 8,001,363 B2 | 8/2011 | Shihadeh |
| 9,535,701 B2 | 1/2017 | Rijshouwer |
| 2007/0204137 A1* | 8/2007 | Tran .................... G06F 9/30181 712/214 |

(Continued)

Primary Examiner — Daniel H Pan
(74) Attorney, Agent, or Firm — Meyertons, Hood, Kivlin, Kowert & Goetzel, P.C.

(57) ABSTRACT

A method and apparatus for performing branch prediction is disclosed. A branch predictor includes a history buffer configured to store a branch history table indicative of a history of a plurality of previously fetched branch instructions. The branch predictor also includes a branch target cache (BTC) configured to store branch target addresses for fetch addresses that have been identified as including branch instructions but have not yet been predicted. A hash circuit is configured to form a hash of a fetch address, history information received from the history buffer, and hit information received from the BTC, wherein the fetch address includes a branch instruction. A branch prediction unit (BPU) configured to generate a branch prediction for the branch instruction included in the fetch address based on the hash formed from the fetch address, history information, and BTC hit information.

20 Claims, 5 Drawing Sheets

(56) References Cited

U.S. PATENT DOCUMENTS

| | | |
|---|---|---|
| 2013/0346727 A1* | 12/2013 | Reddy .................. G06F 9/3806 |
| | | 712/205 |
| 2016/0026470 A1 | 1/2016 | Manoukian |
| 2017/0068544 A1 | 3/2017 | Abdallah |
| 2018/0101385 A1* | 4/2018 | Wang .................... G06F 9/3806 |

* cited by examiner

| Cycle | 0 | 1 | 2 | 3 | 4 | 5 | 6 |
|---|---|---|---|---|---|---|---|
| F1 | A1 | A2 CTI Lookup BP Using X BTC Taken | A3 CTI Lookup BP Using X BTC Taken | A4 CTI Lookup BP Using X BTC Not-Taken | A5 CTI Lookup BP Using X | | |
| F2 | | A1 | A2 BTC_TAKEN | A3 BTC_TAKEN | A4 BTC Not-Taken | | |
| F3 | | | A1 | A2 BTC_TAKEN | A3 BTC_TAKEN | A4 | |
| F4 | | | | A1 | A2 BTC_TAKEN Update Branch History | A3 Update Branch History | A4 Update Branch History |
| Branch History | X | X | X | X | $X_{A2}$ | $X_{A2A3}$ | $X_{A2A3A4}$ |

METHOD AND APPARATUS FOR AUGMENTATION AND DISAMBIGUATION OF BRANCH HISTORY IN PIPELINED BRANCH PREDICTORS

BACKGROUND

Technical Field

This disclosure is directed to processors, and more particularly, to branch prediction in pipelined processors.

Description of the Related Art

Modern processors may achieve high performance by pipelining and executing multiple instructions in parallel and out-of-order. Pipelining may allow a processor to operate at higher frequency, which in turn may result in higher performance and throughput.

Control transfer instructions (CTIs) such as branches, calls, and returns, may be highly prevalent in programs. These instructions can cause pipelined processor to stall, since the instructions to be executed after a CTI are not known until the CTI itself is executed. Stalls in a pipeline can cause performance loss.

One way to alleviate the potential loss in performance is to employ branch prediction to speculatively fetch and execute instructions beyond a branch instruction. When a branch predictor correctly predicts the direction of a branch, performance increases may be achieved, as results from the speculatively executed instructions beyond the branch may be available at the time the branch instruction is correctly predicted. If a branch is incorrectly predicted, the speculatively executed instructions may be flushed and the instruction sequence may be replayed.

Branch predictors may rely on the history of previous branch predictions. Accordingly, a history buffer may be associated with a branch predictor, and may store the history of a number of previously predicted branches. The most recent is often times critical to correctly predicting the next branch.

SUMMARY

A method and apparatus for performing branch prediction is disclosed. In one embodiment, a branch predictor includes a history buffer configured to store a branch history table indicative of a history of a plurality of previously fetched branch instructions. The branch predictor also includes a branch target cache (BTC) configured to store branch target addresses for fetch addresses that have been identified as including branch instructions. A hash circuit is configured to form a hash of a fetch address, history information received from the history buffer, and hit information received from the BTC (for branches that have not been predicted yet), wherein the fetch address includes a branch instruction. A branch prediction unit (BPU) configured to generate a branch prediction for the branch instruction included in the fetch address based on the hash formed from the fetch address, history information, and BTC hit information.

In one embodiment, a method includes receiving a fetch address for a branch instruction, receiving history information from a branch history table, and receiving hit information from a BTC. The method further includes forming, in a hash circuit, a hash of the fetch address, the history information, and the hit information and generating a branch prediction, in a branch prediction circuit, based on the hash.

The various method and apparatus embodiments may utilize hit information from the BTC as a proxy for the most recent branch history. In pipelined processors, the branch history may have a latency that is dependent on the number of stages in the pipeline. For example, if the pipeline has four stages, the branch history may be delayed by four cycles with respect to an incoming branch instruction. If other branch instructions are also in the pipeline, the most recent history is not available from the history buffer, and the lack of the most recent history can adversely impact prediction accuracy. However, the BTC may provide a proxy for the most recent history based on a preliminary prediction made thereby. Thus, utilizing the BTC hit information may increase the accuracy of the branch prediction unit, particularly in situations wherein branch instructions are closely packed together (e.g., one after another).

BRIEF DESCRIPTION OF THE DRAWINGS

The following detailed description makes reference to the accompanying drawings, which are now briefly described.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation [entity] configured to [perform one or more tasks] is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION OF EMBODIMENTS

Generally speaking, a processing core (or simply, a "core") may refer to a unit of a processor that is capable of executing program instructions and processing data independently of other processor cores within the processor, such that multiple cores may execute instructions concurrently. Performance of a processing core may be impacted by a multitude of factors, including processor clock speed, a number of cores included in the processor, and speed of the memory accesses. One method for improving performance is to fetch and buffer instructions for execution so that the instructions are decoded and ready to execute when an execution unit in the core gets to the instruction. Branch instructions, however, may complicate an instruction fetch, as they may redirect program flow to an associated target address. At least some branch instructions may be conditional, in which they either take a branch to the target address or continue with a contiguous program flow to a following instruction dependent upon one or more conditions of the core at the time of execution of the branch instruction. Since the condition at the time of execution is not known, a prediction may be made as to whether the branch instruction will be taken or not.

In addition, some cores may fetch instructions in groups of multiple instructions. While fetching groups of instructions may provide a performance benefit by filling an instruction queue faster, this performance benefit may be diminished when a branch instruction causes program execution to deviate from a current series of instructions. Instructions fetched after the branch instruction may be flushed, resulting in wasted effort involved in the fetching of these instructions. It is noted, that as used herein, to "flush" or "flushing" one or more instructions refers to removing or invalidating the one or more instructions from a fetch buffer and/or instruction queue.

Branch prediction circuits may be used to track branch instructions, collecting a history of fetched and predicted branch instructions (with results of the predictions). Branch prediction circuits may also indicate if a group of fetched instructions associated with a given address (referred to herein as a "fetch group") includes a branch instruction. If a branch instruction is indicated as part of the fetch group, then the next fetch operation may use the target address. While branch prediction may help improve a core's performance, the prediction process can take multiple processing cycles to determine, in response to a prediction that a branch instruction is included, a target address. In some circumstances, the branch prediction may fall behind an execution unit's ability to execute instructions, and reduce instruction throughput. To improve the speed for determining a target address, some processor cores may include a branch target cache (BTC). A BTC stores branch target addresses for fetch addresses that have been identified as including branch instructions. Even a BTC may use multiple processor cycles to produce a target address, and, therefore, result in wasted cycles used to fetch instructions while waiting for the target address, if these fetched instructions are later flushed, although the penalty is less than a missed branch prediction by a branch prediction unit.

One of the problems in accurately predicting the behavior of a predicted branch in a pipelined processor is that the branch predictor does not always have the most recent history (particularly when branch instructions are tightly grouped). In pipelined processors, it typically takes a number of cycles (e.g., four) from the time a branch instruction enters the pipeline until the branch is predicted. If another branch instruction enters the pipeline while the direction of one or more other branch instructions remains unpredicted, a corresponding branch prediction will not have all the most recent history regarding predicted branches and results of those prediction (namely, for those branch instructions that are still pending). Thus, when multiple branches are pending, the predictions for any of them by a history-based branch prediction unit may be less accurate.

The disclosure herein is directed to a system and method in which hit information in the BTC is used as a proxy for the most recent history, i.e. that of branch instructions that are still pending. The history from a history buffer may be augmented with hit information for otherwise unpredicted branches from the BTC, with the prediction being formed based on the augmented history. This may increase the accuracy of branch predictions when branch instructions are tightly grouped, e.g., one right after another.

Various embodiments of a system and method to augment branch history with BTC hit information are discussed below.

It is noted that, as used herein, an "issued," "issuing," or to "issue" an instruction refers to selecting an instruction to be executed by a processing core. In a processing core that only supports in-order execution, issuing may consist of selecting a next instruction in a series of instructions. In a processing core that allows out-of-order processing, the core may include circuitry that selects an instruction to be issued ahead of a previously received instruction if the previously received instruction is stalled (e.g., cannot start or complete execution due to a resource limitation). In the embodiments presented herein, out-of-order processing of instructions is permitted.

Figure 1:
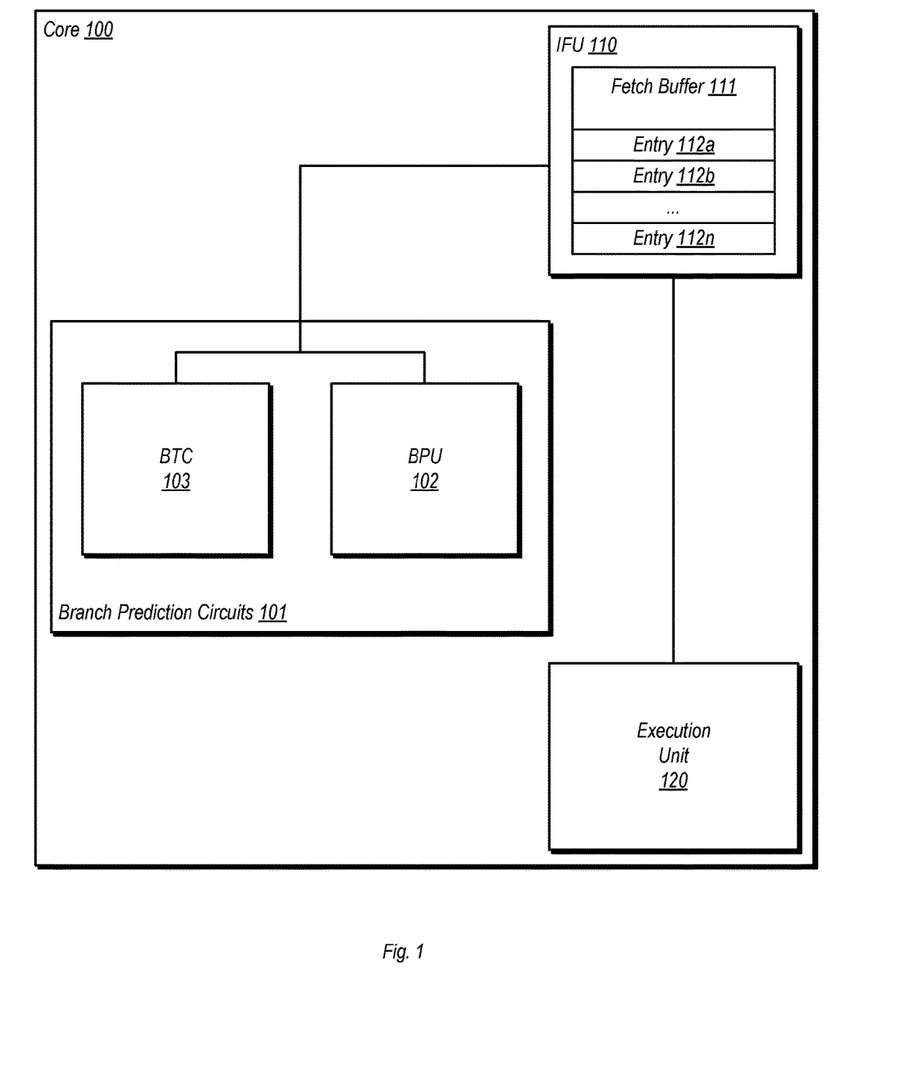
FIG. 1 is a block diagram of one embodiment of a processor core including an instruction fetch unit and a branch predictor.

A block diagram of an embodiment of a processing core is illustrated in FIG. 1. In the illustrated embodiment, core 100 includes branch prediction circuits 101 coupled to instruction fetch unit (IFU) 110, which is, in turn, coupled to execution unit 120. Branch prediction circuits 101 include branch prediction unit (BPU) 102 and branch target cache (BTC) 103. IFU 110 includes fetch buffer 111.

In the illustrated embodiment, branch predictions circuits 101 are used to predict branch instructions and/or target addresses for fetch operations. BPU 102 includes logic circuits to track if a fetch group includes a branch instruction, and if predicted branch instructions take their respective branches or not. BPU 102 may use a branch history table stored in a history buffer to track a number of times a branch instruction is taken versus how often the branch is not taken. BPU 102 may also track patterns of taking or not taking a particular branch. Using the data collected in the history table, BPU 102 determines prediction value indicating if a given branch will be taken or not. BPU 102 may also determine a target branch address when a given fetch group is identified as including a branch instruction.

Although BPU 102 may determine a target address for a predicted taken branch, the time for determining the target address may cause wasted cycles in a pipeline of core 100. To mitigate these wasted cycles, branch prediction circuits 101 may use BTC 103 to cache previously used target addresses. If an address of a fetch group has a corresponding entry in BTC 103 (a BTC "hit"), then fetch operations may continue using a target address included in the corresponding entry. If a corresponding entry is not found for the address of the fetch group (a BTC "miss"), then program fetches will continue sequentially or dependent upon a result from BPU 102.

BPU 102 may operate with BTC 103 in the various embodiments discussed herein. Hit/miss information regarding branches not yet predicted from BTC 103 may be augmented with history from a branch history table in generating a prediction by BPU 102. The hit/miss information may act as a proxy for recent history of branch instructions that is otherwise not yet reflected in the branch history. In one embodiment, a hash operation may be performed on a fetch address associated with a branch instruction, branch history from a branch history table, and hit/miss information from BTC 103 regarding branches that have not yet been predicted. This hash is then provided to BPU 102, which generates a branch prediction based on the hash. In situations in which branch instructions are tightly grouped (e.g., one right after another), the use the BTC hit/miss information regarding unpredicted branches to augment the branch history may provide significant improvements to branch history prediction. In other cases, wherein the branch instructions are spaced farther apart (e.g., by five or more cycles, with the BTC indicating no hits), the most recent history will be available to BPU 102, thereby enabling accurate predictions.

BTC 103 may retrieve a cached target address before BPU 102 and determine a predicted target address. Upon BPU 102 determining the target address for a given fetch group, a control circuit in branch prediction circuits 101 may compare the predicted target address from BPU 102 to the cached target address from BTC 103. If the two addresses match, then fetch operation may continue using the cached target address. If there is a mismatch, however, then any instructions fetched using the cached target address are flushed (i.e., discarded or invalidated) and instruction fetching restarts using the predicted target address from BPU 102.

Instruction fetch unit (IFU) 110 may be configured to retrieve instructions for execution in core 100. In the illustrated embodiment, IFU 110 performs various operations relating to the fetching of instructions from cache or memory, and the decoding of instructions prior to the instructions being issued for execution. Instruction fetch unit 110 includes fetch buffer 111 to store fetched instructions before they are sent to execution unit 120. In various embodiments, IFU 110 may fetch a single instruction or multiple instructions per fetch operation. A group of one or more instructions retrieved in a single fetch operation may be referred to as a "fetch group." Fetch buffer 111 includes entries for fetch groups 112a-112n, which may correspond to any suitable number of fetch group entries.

In one embodiment, IFU 110 is configured to maintain a pool of fetched, ready-for-issue instructions to be executed by core 100. IFU 110 may receive branch predictions and/or corresponding target addresses from branch prediction circuits 101 after a fetch group including a branch instruction has been fetched and stored in one of fetch group entries 112. These target addresses are used for further instruction fetches. Upon a determination that a branch direction has been mispredicted, IFU 110 may flush one or more entries 112 from fetch buffer 111, and restart instruction fetches following the mispredicted branch instruction using an address value determined from the execution of the branch instruction.

Execution unit 120 may be configured to process and provide results for instructions issued from IFU 110. In some embodiments, execution unit 120 may be configured to execute certain integer-type instructions defined in the implemented ISA, such as arithmetic, logical, and shift instructions, while other instructions, such as, for example, floating point arithmetic instructions may be executed by a coprocessor, such as a floating point unit (not shown). It is contemplated that in some embodiments, core 100 may include more than one execution unit 120, and each of the execution units may or may not be symmetric in functionality.

It is noted that FIG. 1 is merely an example of a processing core. For clarity, the processing core of FIG. 1 has been simplified to shown only circuit blocks related to the disclosed concepts. In other embodiments, core 100 may include additional circuit blocks, such as, for example, multiple execution units and/or one or more coprocessing units (e.g., a floating point unit or a cryptography accelerator).

Figure 2:
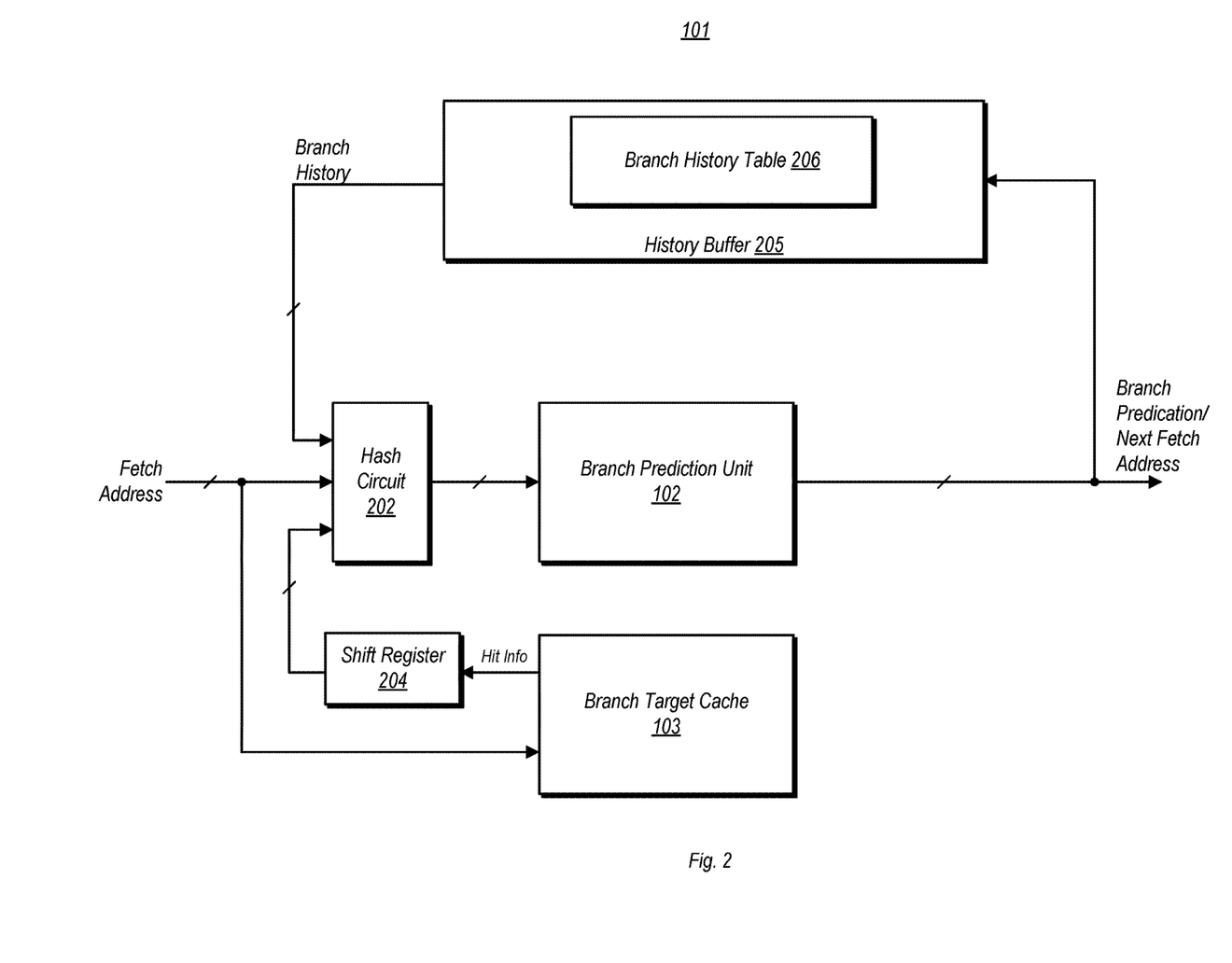
FIG. 2 is a block diagram providing further illustration of one embodiment of a branch predictor.

Turning now to FIG. 2, a block diagram of one embodiment of a branch predictor 101 (equivalent to branch prediction circuits 101 of FIG. 1). In the embodiment shown, branch predictor 101 includes a history buffer 205, which includes a branch history table 206 stored therein. In various embodiments, the processor in which branch predictor 101 is implemented may be a multi-threaded processor. Accordingly, in such embodiments, multiple instances of branch history table 206 may be present, with each branch history table corresponding to one of the active threads. For a given thread, a corresponding instance of branch history table 206 may indicate whether a certain number of previous branches were taken or not taken.

Branch predictor 101 also includes BTC 103. As noted above, BTC 103 may store branch target addresses for fetch addresses that have been identified as including branch instructions. When a fetch address identified as including a branch instruction is provided to BTC 103, a search may be conducted for a corresponding branch target address. If an address of a fetched instruction matches that of an address stored in BTC 103, a BTC hit may be registered. A BTC hit may be the equivalent of a preliminary prediction that a branch will be taken for the branch instruction associated with the branch target address. When a branch instruction is fetched and its corresponding branch target address is not in BTC 103, a BTC miss is registered. A BTC miss may be the equivalent of a preliminary prediction of a branch not taken for the fetched branch instruction. Generally speaking, BTC 103 may provide hit information (i.e. hit or no hit, the latter also referred to as a miss) for as yet to be predicted branch instructions that are currently in various stages of the processor pipeline. In contrast, the branch history provided from branch history table 206 in history buffer 205 is directed to the history of branch instructions that have completed execution.

BTC 103 in the embodiment shown is coupled to shift register 204, which is shifted each cycle. In each instance that BTC 103 is checked for the presence of a branch target address, information is provided to update the contents stored in shift register 204. More particularly, BTC 103 indicates to shift register whether there was a hit or no hit. The oldest contents of shift register 204 are evicted therefrom responsive to receiving the latest hit/miss information. In one embodiment, BTC 103 may provide a logic 1 if a hit is registered, and a logic 0 if a miss is registered. The number of bits stored in shift register 204 may vary from one embodiment to the next. For example in one embodiment, shift register 204 may store hit/miss information for up to three queries of BTC 103 (corresponding to three branch instructions in the processor pipeline), and thus stores three bits.

Branch predictor 101 also includes a hash circuit 202. The hash circuit 202 is coupled to receive three pieces of information and form a hash based thereon. The first piece of information is a fetch address that is associated with a branch instruction. More particularly, the fetch address may be the location from which a branch instruction to be predicted has been fetched. The second piece of information provided to hash circuit 202 is a branch history information from branch history table 206. The branch history information may be a vector indicative of the resolved history of branches (e.g., whether taken or not taken) for a number of previously predicted branch instructions. These previously predicted branch instructions may belong to the same thread as the branch instruction corresponding to the fetch address. The third piece of information provided to hash circuit 202 is the BTC hit information (which may pertain to unpredicted branches) stored in shift register 204. This may be a small vector (e.g., three bits) that serves as a proxy for the most recent history that is not captured by history stored branch history table 206.

Figure 3:
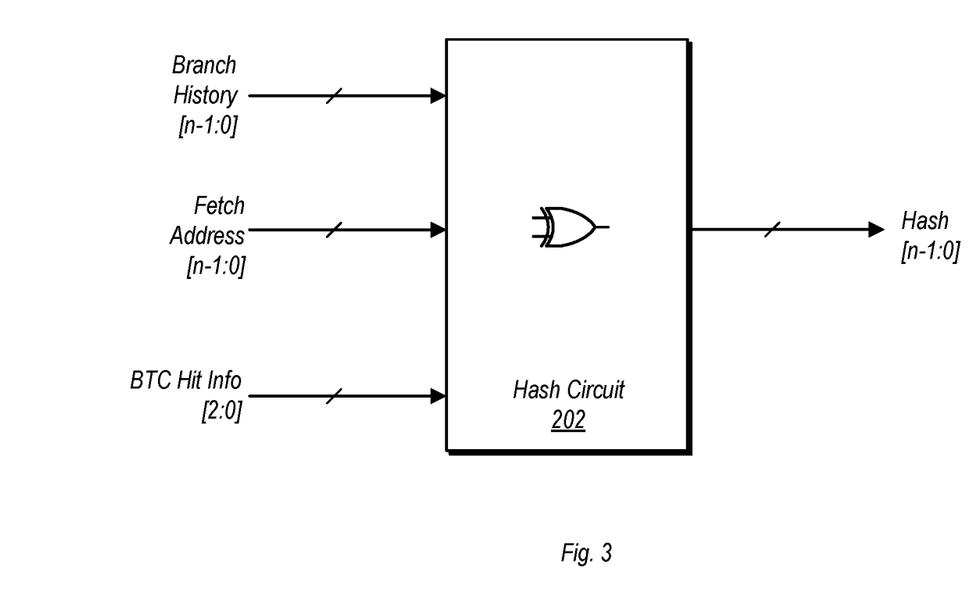
FIG. 3 is a diagram providing illustration of one embodiment of a hash circuit.

Hash circuit 202 may form a hash of the three pieces of information provided thereto. Turning momentarily to FIG. 3, a block diagram further illustrating one embodiment of a hash circuit 202 is illustrated. In the embodiment shown, a branch history of n bits is combined with n bits of a fetch address (which may in some cases be larger than n bits) and the, e.g., three bits of BTC hit information. Hash circuit 202 may perform a bitwise exclusive ORing of the received information to produce the hash. For example, the n bits of branch history may be bitwise exclusively ORed with the n bits of address provided. Thereafter, the lower three bits of the result may be bitwise exclusively ORed with the three bits of BTC hit information to produce the final hash. This hash of n bits may then be output from hash circuit 202. It is noted that this hash circuit is only one possible embodiment, and others are possible and contemplated. For example, an embodiment in which the logic 1's in shift register 204 are summed in forming the hash is also possible and contemplated. In general, any suitable mechanism for forming a hash may be utilized.

Returning to FIG. 2, the hash is provided to BPU 102. Based on the hash, BPU 102 may generate a prediction for the branch instruction corresponding to the fetch address received by hash circuit 202. The prediction is thus generated based not only on the known branch history stored in branch history table 206, but also on a proxy (from BTC 103) for the most recent branch history that has not yet been recorded in branch history table 206. The branch prediction may then be provided from BPU 102 to instruction fetch unit 110 shown in FIG. 1. In some embodiments, the next fetch address based on the prediction may also be provided.

The resulting prediction may be more accurate for instances when branch instructions are tightly grouped or closely spaced. For example, if multiple consecutive branch instructions are received in a thread, utilizing the proxy for the most recent branch history, from the hit information generated by BTC 103, may result in more accurate predictions than those that are based solely on history stored in branch history table. Consider an example where the instruction stream includes loops with the following pattern:

Instruction 1: Branch Taken
Instruction 2: Branch Taken
Instruction 3: Branch Not Taken.

For at least the latter two instructions, the branch history stored in branch history table will not include that of the prior instruction, since these instructions are still in the pipeline and have not yet been predicted or executed. Without this history, branch predictions for these instructions would be less accurate and could lead to more mispredictions in the absence of any additional information. Thus, BTC 103 can provide a proxy for the history that is otherwise unknown. For example, a prediction for instruction 2 can be based, in part, on the hit information for instruction 1. The prediction for instruction 3 can be based, in part, on the hit information for both instructions 1 and 2.

If another branch instruction immediately follows instruction 3, its prediction may be based, in part, on hit information for instructions 1, 2, and 3. Using this hit information, BPU 103 is more likely to correctly predict the direction of instructions 2 and 3 than if the instruction was based solely on history from branch history table 206.

For instances when the branch instructions are more widely spaced, information from branch history table 206 may be sufficient. For example, if the most recent branch instruction prior to instruction 1 above occurred 10 cycles earlier, the branch history stored in branch history table 206 will reflect the most recent history for the corresponding thread, since the most recent branch instruction will have been predicted and its direction (taken or not taken) will be known. In this situation, shift register 204 will not hold any information regarding branches due to the spacing between the branches, and therefore the branch history may be sufficient to enable an accurate prediction when branch instructions are spaced farther apart from one another. However, since many programs have tightly nested loops which include consecutive or closely spaced branch instructions, the use of the hit information from BTC 103 may increase the overall accuracy of BPU 102.

Figure 4:
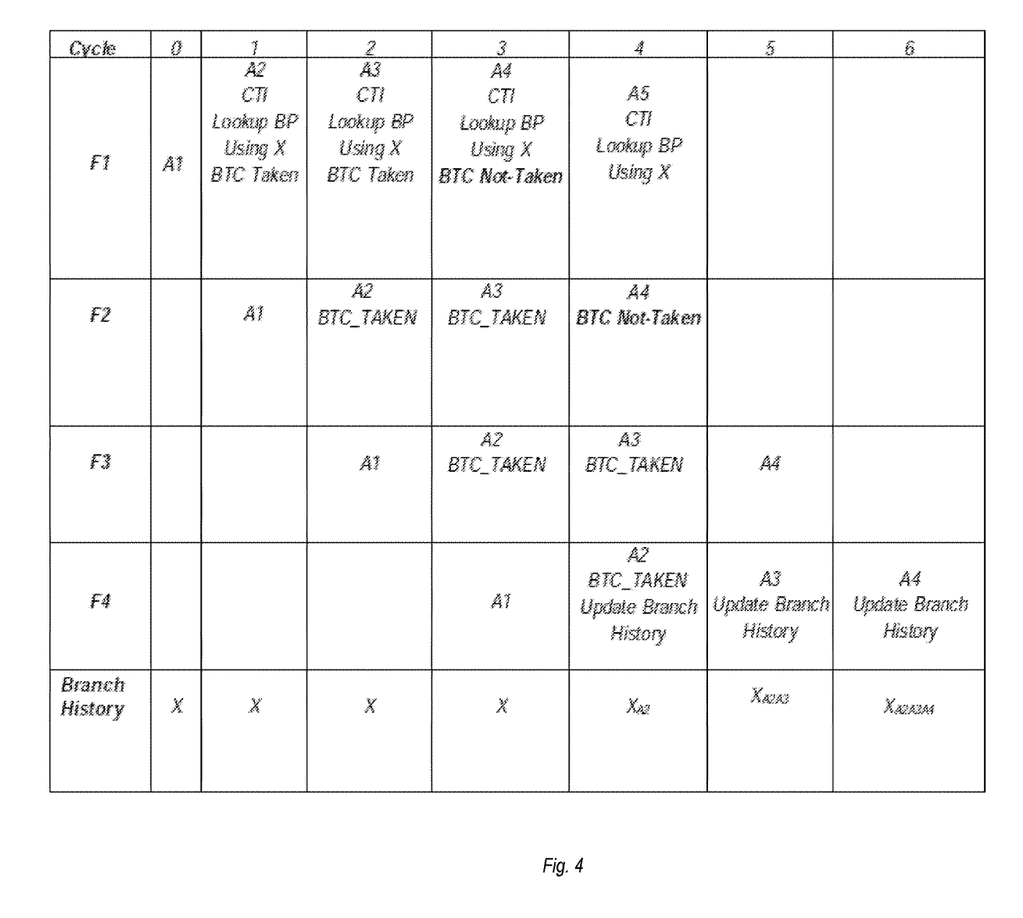
FIG. 4 is a diagram illustrating operation of one embodiment of a processor pipeline with regard to branch instructions.

FIG. 4 is a diagram illustrating operation of one embodiment of a processor pipeline with regard to branch instructions. More particularly, FIG. 4 illustrates the progression of branch instructions through a pipeline based on their respective branch target addresses in BTC 103.

In the example shown, F1, F2, F3, and F4 are the pipeline stages. A1, A2, A3, A4, and A5 are addresses from which instructions being fetched in cycles 0, 1, 2, 3, and 4 respectively. Those that are designated with the term 'CTI' (Control Transfer Instruction) are associated with instructions that include branches. In this example, address A1 does not have a branch instruction, while A2, A3, A4, and A5 each have branch instructions. Branch history, used to access the branch predictors, is updated in the F4 stage of the pipeline. The branch history is assumed to be X prior to the sequence in this example.

Address A1 enters the pipeline at F1 stage in cycle 0, and exits fetch pipeline at F4 stage in cycle 3. Since A1 does not have a branch instruction, BTC 103 predicts A1 to not have any taken any branch (i.e. a BTC miss). Thereafter, the next sequential address, A2, enters the pipeline in cycle 1. The entry of the instruction from address A2 into the pipeline results in a query to BTC 103, as well as to BPU 102. In this case, a BTC hit is the result, and thus BTC 103 provides a taken prediction with a target address of A3. As a result, the instruction from address A3 enters the pipeline in cycle 2. The branch is predicted for the instruction accessed from address A2 in the F4 stage (cycle 4), and the branch history is updated with the corresponding result in cycle 4. The updated branch history is designated here as $X_{A2}$.

The instruction from address A3 in this example is also a branch instruction. Thus, the query of BTC 103 produces another hit, making a preliminary prediction that the branch is taken with a target address of A4. Accordingly, the instruction accessed from address A4 enters the pipeline in cycle 3. The branch for the instruction accessed from address A3 is predicted in cycle 5, causing the branch history to be updated to $X_{A2A3}$. When the instruction from A3 initially access BPU 102, it uses branch history X, which does not include the branch history of the instruction accessed from address A2. However, since BTC 103 provided a preliminary prediction of a hit, this hit information is included in the contents of shift register 204, and thus become part of the hash produced by hash circuit 202.

Accordingly, the BTC hit resulting from the instruction accessed from address A2 serves as a proxy for the branch history of that instruction, which is otherwise yet unavailable for making a prediction for the branch instruction accessed from address A3.

When the instruction from address A4 enters the pipeline, another BTC query is conducted at cycle 3. In this case, the result is a miss, and thus BTC 103 provides a preliminary prediction that the branch is not taken for the instruction accessed from address A4. As a result of the preliminary not-taken prediction, the instruction at the next sequential address, A5, enters the pipeline in cycle 4. The branch for the instruction from address A4 is predicted in cycle 6, after which the branch history is updated to $X_{A2A3A4}$. When the branch instruction from A4 is predicted by BPU 102, the branch history for the instructions from addresses A2 and A3 is not yet available. However, the hit information for instructions from each of addresses A2 and A3 has been provided to shift register 204 at this point. Thus, the BTC hits for instructions from addresses A2 and A3 serve as a proxy for the history that is otherwise unavailable. The preliminary predictions of branches taken, as indicated by the respective hits stored in shift register 204, are included in the hash that is provided to BPU 102 in making the prediction for the instruction obtained from address A4.

The branch instruction at address A5 is predicted in cycle 4, using the branch history X (i.e. the branch history does not yet reflect the results of the branches for instructions from addresses A2, A3, and A4). However, the BTC hits for the instructions from addresses A2 and A3, as well as the BTC miss for the instruction at A4, are all included in the contents of shift register 204. Since the hit/miss information for instructions from addresses A2, A3, and A4 are available at this time, this information may serve as a proxy for their history and be included in the hash provided to BPU 102. Accordingly, the preliminary predictions for instructions at A2, A3, and A4 form a portion of the basis for which a branch prediction is made regarding the instruction from address A5.

In prior art embodiments, wherein the BTC hit/miss information is not used in making a branch prediction, a branch predictor using only the available branch history would be unable to use the prediction information of branches of instructions A2, A3, and A4 when predicting the direction of the branch for the instruction at A5. Thus, the prediction would depend on the history that precedes the instruction from address A2, which may in turn increase the likelihood of a misprediction and the resulting performance penalty. Thus, in providing the hit/miss information for the instructions from addresses A2, A3, and A4, the accuracy of the prediction for A5 may be increased, even though these hits/misses are based on preliminary predictions.

Consider another example wherein instruction A3, and a subsequent instruction, A5, happen to have the same instruction address. In this case, that lack of BTC hit information in a prior art embodiment would result in both A3 and A5 using the same information and would thus result in an identical prediction. If the actual direction of A3 and A5 were different in this case, the prior art branch predictors would have been unable to disambiguate between these two instances of the same branch instruction. In the embodiments disclosed herein, the introduction of BTC hit information of recent branches in making the prediction enables distinct predictions for instructions A3 and A5, even considering they have the same instruction address.

Figure 5:
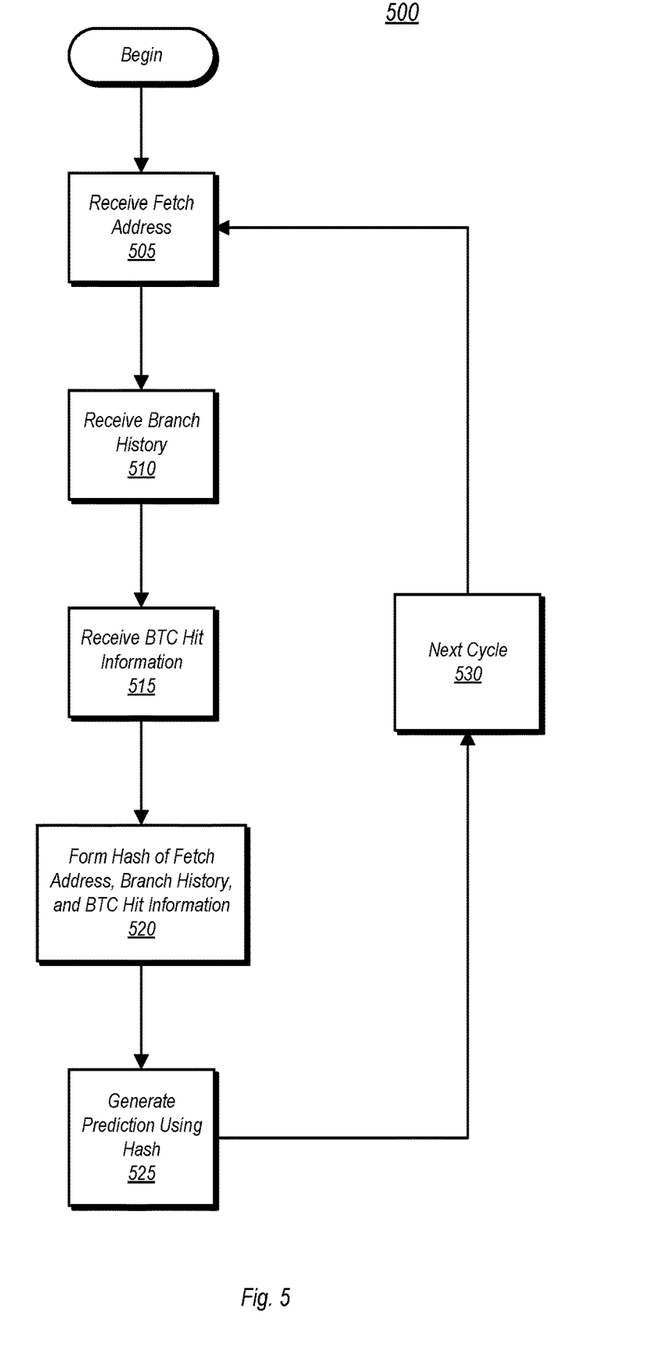
FIG. 5 is a flow diagram of one embodiment of a method for performing branch prediction.

FIG. 5 is a flow diagram illustrating one embodiment of a method for generating a branch prediction. It is noted that at least some of the steps shown herein may be performed concurrently with other steps. Furthermore, it is noted that method 500 may be performed using various embodiments of the hardware discussed above, as well as other hardware embodiments that are not explicitly discussed herein. Method 500 as discussed herein assumes that a branch instruction is associated with a fetch address, and is thus not applicable to instructions (and corresponding fetch addresses) that do not include a branch.

Method 500 includes receiving a receiving a fetch address (block 505). The fetch address in this case is an address from which a branch instruction was fetched. The method further includes receiving branch history (block 510). The branch history may be retrieved from a branch history table in a branch history buffer. The branch history table may correspond to branch history for a particular thread, and may indicate whether branches were taken or not taken for each of a specified number of previous branch instructions. However, in a pipelined processor with multiple pipeline stages, the branch history does not include that for branch instructions that are currently in the pipeline and for which the direction of the branch has not been determined.

Method 500 further includes receiving hit information (which may be referred to as hit/miss information) from a branch target cache. The branch target cache (BTC) may provide preliminary predictions for unpredicted instructions still in the pipeline, as noted above. A BTC hit may be registered when the branch target cache provides a preliminary prediction of a branch being taken. A BTC miss may be registered if the branch target cache provides a prediction of a branch not taken. These BTC hit/miss predictions may be stored in a register, and may thus provide a proxy for branch history that is unavailable—namely that of instructions that are still in the pipeline and have yet to be predicted by the branch predictor.

Using the fetch address, the available branch history, and the branch target cache hit information, a hash is formed (block 520). In one embodiment, the hash may be formed using a bitwise exclusive OR operation as noted above. However, other hash methodologies may be used depending on the specific embodiment. The resulting hash is then provided to a branch prediction unit. Using the hash, the branch prediction unit may generate a prediction regarding the branch instruction (branch taken or not taken) fetched from the provided fetch address. Thereafter, method 500 progresses to the next cycle (block 530), and returns to block 505.

Numerous variations and modifications will become apparent to those skilled in the art once the above disclosure is fully appreciated. It is intended that the following claims be interpreted to embrace all such variations and modifications.

What is claimed is:

1. An apparatus comprising
a history buffer configured to store a branch history table indicative of a history of a plurality of previously fetched branch instructions;
a branch target cache (BTC) configured to store branch target addresses for fetch addresses that have been identified as including branch instructions;
a hash circuit configured to form a hash of a fetch address, history information received from the history buffer, and hit information received from the BTC, wherein the fetch address includes a branch instruction, and wherein the hit information from the BTC comprises information indicative of whether or not branches associated with branch target addresses stored in the BTC were taken or not taken; and
a branch prediction unit (BPU) configured to generate a branch prediction for the branch instruction included in the fetch address based on the hash formed from the fetch address, history information, and BTC hit information.

2. The apparatus as recited in claim 1, wherein the BTC is configured to provide hit information for branch instructions currently in a pipeline, and wherein the history buffer is configured to provide history information for branch instructions that have previously executed.

3. The apparatus as recited in claim 1, wherein the BTC is configured to provide a preliminary prediction for a branch instruction, wherein a hit in the BTC is indicative of a prediction of a branch taken for the branch instruction.

4. The apparatus as recited in claim 3, further comprising a shift register coupled to the BTC, wherein the shift register is configured to store hit information for a plurality of branch instructions currently in a pipeline.

5. The apparatus as recited in claim 4, wherein the BTC is configured to cause contents of the shift register to be updated each cycle.

6. The apparatus as recited in claim 1, wherein the history buffer is configured to store branch history tables for each of a plurality of threads, and further configured to update each history table on a per-thread basis.

7. The apparatus as recited in claim 1, wherein the history stored in the branch history table of the history buffer excludes history of branch instructions currently in a pipeline.

8. The apparatus as recited in claim 1, wherein the hash circuit is configured to form the hash using an exclusive OR (XOR) of the fetch address, the history of the plurality of previously fetched branch instructions, and the BTC hit information.

9. The apparatus as recited in claim 1, further comprising an instruction fetch unit coupled to the branch prediction unit, wherein the instruction fetch unit is configured to fetch instructions from designated addresses.

10. The apparatus as recited in claim 9, wherein the branch prediction unit is configured to provide branch predictions and corresponding fetch addresses to the instruction fetch unit.

11. A method comprising:
receiving a fetch address for a branch instruction;
receiving history information from a branch history table of a history buffer;
receiving hit information from a branch target cache (BTC), wherein the hit information from the BTC comprises information indicative of whether or not branches associated with branch target addresses stored in the BTC were taken or not taken;
forming, in a hash circuit, a hash of the fetch address, the history information, and the hit information; and
generating a branch prediction, in a branch prediction circuit, based on the hash.

12. The method as recited in claim 11, further comprising:
providing, from the BTC, hit information for branch instructions currently in a pipeline; and
providing, from the history buffer, history information indicating whether a branch was taken for each of a plurality of branch instructions that have previously executed.

13. The method as recited in claim 11, further comprising the BTC providing information indicating a hit responsive to making a preliminary prediction of a branch taken for the branch instruction.

14. The method as recited in claim 11, further comprising:
the BTC providing hit information to a shift register;
the shift register storing hit information for a plurality of branch instructions; and
the BTC causing an update of the hit information stored in the shift register responsive to the BTC being updated.

15. The method as recited in claim 11, further comprising:
the branch history table of the history buffer storing history of branch instructions excluding branch instructions currently in a pipeline; and
the BTC storing fetch addresses identified as including branch instructions that are currently in the pipeline.

16. The method as recited in claim 11, further comprising the hash circuit forming the hash by performing an exclusive OR of the fetch address, the history information, and the hit information from the BTC.

17. A processor comprising:
an instruction fetch unit; and
a branch predictor, wherein the branch predictor is coupled to receive, from the instruction fetch unit, an address associated with a corresponding branch instruction, wherein the branch predictor includes:
a history buffer configured to store history information for a first plurality of branch instructions that have previously executed, wherein the history information indicates, for each of the branch instructions, whether or not a corresponding branch was taken;
a branch target cache (BTC) configured to store branch target addresses for fetch addresses that have been identified as including branch instructions;
a hash circuit configured to form a hash of a fetch address, the history information, and hit information received from the BTC, wherein the fetch address includes a branch instruction, and wherein the hit information from the BTC comprises information indicative of whether or not branches associated with branch target addresses stored in the BTC were taken or not taken; and
a branch prediction unit configured to generate a branch prediction for the branch instruction included in the fetch address based on the hash formed from the fetch address, history information, and BTC hit information.

18. The processor as recited in claim 17, wherein the BTC is configured to provide hit information for a second plurality of branch instructions currently in a pipeline, wherein the hit information is based on predictions for each of the second plurality of branch instructions, wherein the BTC is configured to indicate a hit for a given one of the plurality of branch instructions responsive to making a preliminary prediction that a corresponding branch is taken.

19. The processor as recited in claim 17, wherein the branch prediction unit is configured to provide branch predictions and corresponding fetch addresses to the instruction fetch unit.

20. The processor as recited in claim 17, wherein the hash circuit is configured to form the hash using an exclusive OR (XOR) of the fetch address, the history of the first plurality of fetched branch instructions, and the BTC hit information.

* * * * *